United States Patent [19]

Fiala

[11] 4,407,398
[45] Oct. 4, 1983

[54] DRIVE UNIT

[75] Inventor: Ernst Fiala, Wolfsburg, Fed. Rep. of Germany

[73] Assignee: Volkswagenwerk Aktiengesellschaft, Wolfsburg, Fed. Rep. of Germany

[21] Appl. No.: 253,674

[22] Filed: Apr. 13, 1981

[30] Foreign Application Priority Data

Apr. 30, 1980 [DE] Fed. Rep. of Germany ....... 3016620

[51] Int. Cl.³ .............................................. B60K 41/28
[52] U.S. Cl. ............................. 192/0.055; 192/0.076; 180/165
[58] Field of Search ............... 192/0.098, 0.073, 0.075, 192/0.076, 0.09, 0.092, 0.094, 0.096, 58 A, 0.02 R, 0.055; 74/572; 180/165; 123/179 J

[56] References Cited

U.S. PATENT DOCUMENTS

| | | | |
|---|---|---|---|
| 3,447,013 | 11/1969 | Smith | 192/0.02 R |
| 3,771,311 | 11/1973 | Herbst | 180/165 X |
| 3,882,950 | 5/1975 | Strohlein | |
| 3,886,810 | 6/1975 | Sugiyama et al. | 180/165 X |
| 4,131,171 | 12/1978 | Keyes | 192/0.033 |
| 4,252,208 | 2/1981 | Heidemeyer et al. | 180/165 |
| 4,259,930 | 4/1981 | Hofbauer | 123/179 J |
| 4,282,947 | 8/1981 | Kemper | 180/165 |
| 4,342,371 | 8/1982 | Smitley | 180/165 X |
| 4,343,387 | 8/1982 | Hofbauer | 192/3.58 X |

FOREIGN PATENT DOCUMENTS 2545798 10/1975 Fed. Rep. of Germany .
2501386 7/1976 Fed. Rep. of Germany .
2522420 9/1976 Fed. Rep. of Germany .
2833961 2/1980 Fed. Rep. of Germany .

Primary Examiner—George H. Krizmanich
Attorney, Agent, or Firm—Brumbaugh, Graves, Donohue & Raymond

[57] ABSTRACT

An improved drive unit for a vehicle having an internal combustion engine, an automatic transmission and a clutch comprising a servo-powered mechanical coupling part and a fluid coupling part is disclosed. The fluid coupling part serves as the flywheel for the engine. An auxiliary starting motor rotates the flywheel to a speed sufficient to start the internal combustion engine when the accelerator pedal is depressed, thereby closing the mechanical coupling part and connecting the flywheel with the engine crankshaft. When the accelerator pedal is released the mechanical coupling part opens to stop the engine in all engine-braking phases, thereby maximizing fuel conservation.

4 Claims, 1 Drawing Figure

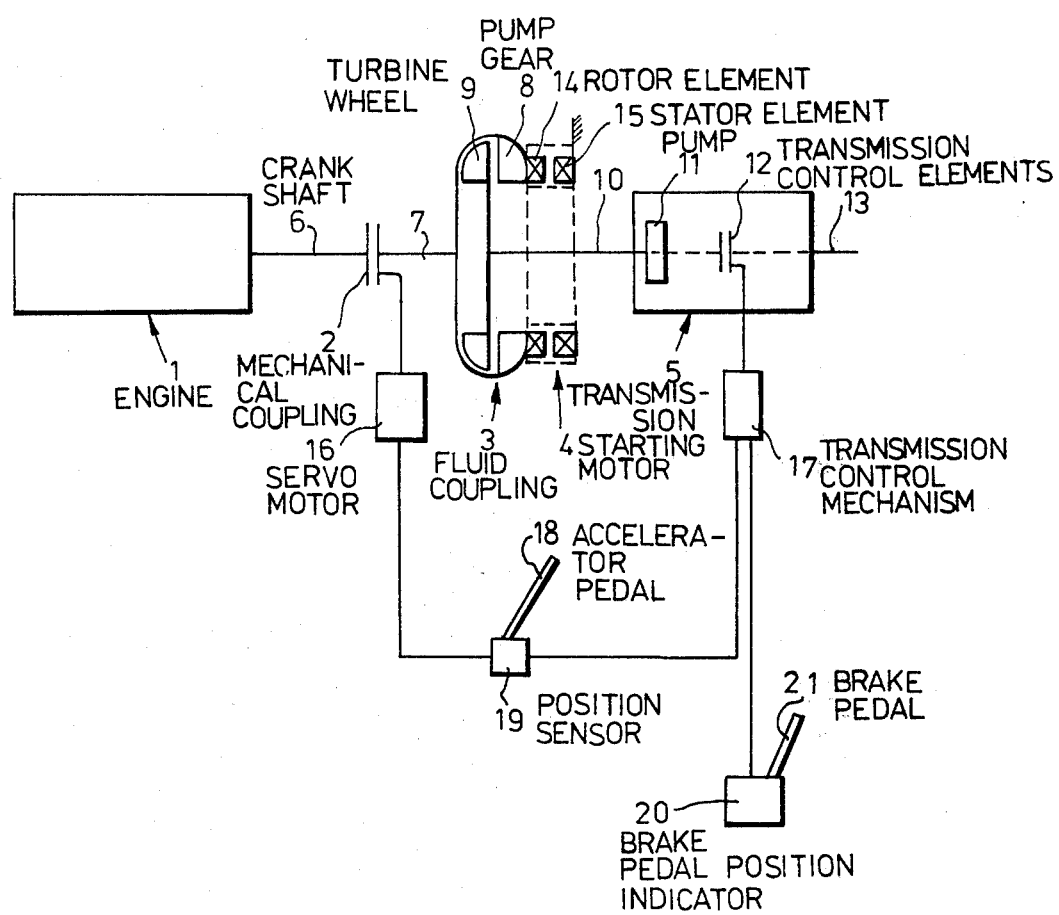

DRIVE UNIT

BACKGROUND OF THE INVENTION

This invention relates to drive units for automobiles, and in particular to automobiles having automatic transmissions.

Throughout much of the operational time of a vehicle, in particular a passenger automobile, the engine runs without driving the vehicle. For example, during intermittent short-time stopping of the vehicle, e.g., due to traffic conditions, the engine, with the transmission in neutral, will continue to turn at the idling speed. Also, during deceleration and coasting, not only is the engine not driving the vehicle, but it will itself be driven at a higher speed by the vehicle's forward momentum acting through the wheels of the car and transmission. Such coasting or deceleration occurs not only on driving downhill, but whenever during travel the driver releases the accelerator pedal.

In both operating conditions, deceleration as well as idling, fuel delivered to the engine is wasted inasmuch as it is not utilized to drive the vehicle. In some cases of coasting and deceleration, braking by the engine is desirable for reasons of safety to boost the main foot brake, since the engine is used to dissipate kinetic energy. In cases other than travel down a steep incline, however, the fact that the engine continues to run when not powering the vehicle constitutes an unprofitable utilization of increasingly scarce fuel resources.

Commonly-owned copending U.S. application Ser. No. 191,079, filed Sept. 26, 1980, discloses a drive train for a vehicle having an automatic transmission which utilizes an auxiliary starting motor and an internal combustion engine to eliminate the requirement for a torque converter. A non-combustion type starting motor, preferably electric, is used for the initial acceleration of the vehicle, through the flywheel and the automatic transmission, until a pre-selected rotational flywheel speed or vehicle speed is achieved. At this point, a mechanical clutch is closed thereby connecting the flywheel to the crankshaft of the internal combustion engine and rapidly starting the engine. The internal combustion engine is disconnected in engine-braking and idling phases of operation when the mechanical clutch is opened by a servo-motor which operates as a function of the position of the accelerator pedal. In this prior copending application, however, the internal combustion engine is not always disconnected in all engine-braking and idling phases.

According to the present invention, an improved drive train is provided whereby the internal combustion engine is disconnected in all engine-braking and idling phases to maximize fuel conservation, yet sufficient energy is maintained in the flywheel mass to start the internal combustion engine immediately when the accelerator pedal is depressed.

SUMMARY OF THE INVENTION

In accordance with the present invention, there is provided a vehicle drive train comprising an internal combustion engine having a crankshaft, which is connectable to a flywheel by a clutch. The clutch comprises a mechanical coupling part, and a fluid coupling part which acts as the flywheel mass for the engine and replaces the conventional flywheel generally associated with an internal combustion engine. The turbine wheel of the fluid coupling part is fixed on the input shaft of an automatic transmission, without the interposition of the hydrodynamic torque converter normally associated with an automatic transmission. The pump gear of the fluid coupling part is connected with an auxiliary electric starting motor which operates the fluid coupling part.

The mechanical coupling part of the clutch is operated by a servo-motor which operates as a function of the position of the accelerator pedal. To this end, the accelerator pedal is equipped with a sensor that detects the position of the accelerator pedal and provides an electrical indication of the position thereof to the servo-motor.

When the vehicle is started both the mechanical coupling part of the clutch and the control elements of the transmission are disconnected, and the auxiliary starting motor operates to accelerate the fluid coupling that serves as the flywheel to a predetermined rotational speed sufficient to start the internal combustion engine, for example, 1500 r.p.m.

When the accelerator pedal is depressed the servo-motor operates to close the mechanical coupling part and connect the already rotating flywheel to the engine crankshaft, thereby rapidly starting the internal combustion engine due to the energy stored in the flywheel. The internal combustion engine thereafter provides the principal driving power to drive the vehicle, and the starting motor can serve as the generator to charge the vehicle battery.

If the accelerator pedal is released, causing the engine to brake, the mechanical coupling part opens, thereby stopping the internal combustion engine to conserve fuel while the vehicle continues to roll freely. The flywheel will continue to rotate, although gradually slowing due to frictional losses. However, the starting motor prevents the flywheel rotational speed from falling below the speed necessary to maintain sufficient kinetic energy in the flywheel to start the internal combustion engine immediately when the accelerator pedal is depressed. The control elements of the automatic transmission disengage only upon the application of the brake pedal.

For a better understanding of the invention, together with other and further objects, reference is made to the following description taken in conjunction with the accompanying drawing.

BRIEF DESCRIPTION OF THE DRAWING

The single FIGURE is a schematic diagram of the engine, clutch mechanisms and automatic transmission in accordance with the present invention.

DETAILED DESCRIPTION OF THE DRAWING

In accordance with the preferred embodiment of the invention, there is provided a reciprocating-piston internal combustion engine 1 having a crankshaft 6. At the end of the crankshaft 6 a clutch is provided, the clutch comprising a mechanical coupling part 2, and a fluid coupling part 3 which serves as the flywheel mass of the engine 1 and replaces the conventional flywheel which is generally a part of the internal combustion engine.

The mechanical coupling part 2 of the clutch is connected by an intermediate shaft 7 with the pump gear 8 of the fluid coupling part 3. The fluid coupling part 3 has a turbine wheel 9 which is fixed on the transmission input shaft 10 of the automatic transmission 5 which in turn operates a pump 11 for supplying pressure to the control elements, such as clutches and brakes, of the transmission 5 which are represented here schematically as a clutch 12. The pump 11 may also supply pressure to the mechanical coupling part 2. The transmission output shaft 13 leads to the differential gear (not illustrated).

A position sensor 19 is associated with the accelerator pedal 18, and delivers a signal indicative of the position of the accelerator pedal 18 to the servo-motor 16, which operates the mechanical coupling part 2 to engage and disengage the engine 1 and the fluid coupling part 3 which serves as the flywheel, depending upon the operating condition of the vehicle, e.g., starting, engine-braking, or idling, as will be described more fully below.

Although the construction and operation of the automatic transmission 5 are neither illustrated nor discussed in detail, it will be appreciated by those skilled in the art that it is of the known type having at least one planetary gear train, the individual control elements 12, such as clutches and brakes, being controlled by a control mechanism 17 also known in the art, which delivers hydraulic fluid to the control elements 12 as a function of the operating condition of the vehicle. This may be accomplished, for example, by a position sensor 19 coupled to the accelerator pedal 18, and/or a position sensor 20 coupled to the brake pedal 21, which deliver output signals to the control mechanism 17 for generating shifting signals for controlling the transmission 5.

According to the invention an auxiliary starting motor 4 is also provided. The starting motor 4 is connected with the pump gear 8 of the fluid coupling part 3 via a rotor element 14, and with the stationary stator element 15. The starting motor 4, as will be described, operates selectively as a generator to charge the vehicle battery, or as a motor to operate the fluid coupling part 3.

When the vehicle is started both the mechanical coupling part 2 and the control elements 12 of the transmission 5 are disconnected, i.e., neither the engine 1 nor the transmission 5 are connected with the fluid coupling 3. When the ignition switch is turned on the starting motor 4 accelerates the fluid coupling 3, now serving as the flywheel mass, to a predetermined rotational speed, for example, 1500 r.p.m., to store sufficient kinetic energy to start the internal combustion engine 1. This predetermined rotational speed may be made dependent upon the vehicle operating temperature, or the temperature of the cooling water, so that when the engine is started cold, sufficient kinetic energy is stored in the flywheel mass to start the engine 1. The pump 11 supported on the transmission shaft 10 is driven by the fluid coupling 3, therby supplying pressure to the automatic transmission. The pump 11 may also be used to supply pressure to the mechanical coupling 2.

When the accelerator pedal 18 is depressed from its rest position, the position sensor 19 delivers a signal to the servo-motor 16, thus closing the mechanical coupling 2. The fluid coupling 3, which is rotating at sufficient speed due to the operation of starting motor 4 is thereby connected with, and immediately starts, the internal combustion engine 1. After the engine 1 is started, the control elements 12 of the transmission 5 associated with a conventional starting gear, for example first gear, are operated so that the vehicle accelerates, its acceleration continuing in response to continued depression of the accelerator pedal 18 as indicated by the sensor 19, while the gears of the transmission 5 shift in the conventional manner.

If the accelerator pedal 18 is released causing the engine 1 to brake, the sensor 19 delivers a signal to the servo-motor 16 which opens the mechanical coupling 2. The engine 1 and the fluid coupling 3 are thus disconnected. However, the fluid coupling 3 remains connected with the transmission 5. Activation of the brake pedal, as indicated by sensor 20, delivers a signal to the control mechanism 17 whereby the fluid coupling 3 and the transmission 5 are disconnected by opening of the control elements 12. In many engines, e.g., the common four-cylinder four-stroke engine, the moment of inertia alone is not sufficient for uniform continuation of the rotation of the crank mechanism from one firing location to the next. Thus, the interruption of the connection between the engine 1 and the fluid coupling 3 will be itself sufficient to stop the engine 1. However, if the engine is such that it will not stop by itself on uncoupling of the flywheel, as, for example, an engine having six or more cylinders, an ignition circuit cut off, or control signal interrupting the fuel supply, may be used to stop the engine. Thus the engine 1 is stopped to maximize fuel conservation while the vehicle continues to roll freely and the fluid coupling 3 continues to rotate at the rotational speed present when the brake was applied opening the control elements 12.

Although the fluid coupling 3 gradually slows due to frictional losses, the starting motor 4 prevents the flywheel rotational speed from decreasing below the speed necessary to store sufficient kinetic energy in the fluid coupling 3 to start the engine 1 again immediately when the accelerator pedal 18 is depressed.

While there has been described what is believed to be the preferred embodiment of the invention, those skilled in the art will recognized that other and further modifications and variations may be made thereto without departing from the spirit of the invention. All such modifications and variations, therefore, are intended to be encompassed within the spirit and scope of the appended claims.

I claim:

1. An improved drive unit for a vehicle including a reciprocating-piston internal combustion engine having a crankshaft, comprising a multiple-gear automatic transmission and a clutch interposed between said engine and said automatic transmission, said transmission operating as a function of the operating condition of the vehicle, said clutch comprising a mechanical coupling part, and a fluid coupling part which serves as the flywheel mass for said engine, wherein said mechanical coupling part is interposed between said crankshaft and said flywheel mass, said fluid coupling part further comprising means for connecting said fluid coupling part with an input shaft of said transmission, and pump means for connecting said fluid coupling part to an auxiliary starting motor, said auxiliary starting motor selectively operating as a generator to charge a battery of said vehicle and as a motor to maintain a predetermined rotational speed of said fluid coupling part during engine-braking and stopping operating conditions of said vehicle.

2. A drive unit according to claim 1, wherein said mechanical coupling part is connected with a means for operating said mechanical coupling part as a function of the position of an accelerator pedal of said vehicle.

3. A drive unit according to claim 2, wherein said means for operating said mechanical coupling part comprises a servo-motor which receives signals from an accelerator pedal position signal indicator means, said servo-motor operating to engage said mechanical coupling part when said accelerator pedal is depressed away from its rest position, and operating to disengage said mechanical coupling part when said accelerator pedal is released and moves toward said rest position.

4. A drive unit according to any of claims 1 to 3, wherein said automatic transmission further comprises control elements which operate selectively as a function of the position of the accelerator pedal and an brake pedal of said vehicle, said control elements disengaging when said accelerator pedal is released and said brake pedal is depressed from its rest position, and engaging when said accelerator pedal is depressed from its rest position.

* * * * *